US012642299B2

(12) United States Patent
Wu et al.

(10) Patent No.: US 12,642,299 B2
(45) Date of Patent: Jun. 2, 2026

(54) HEATING ASSEMBLY AND ELECTRIC HEATING SMOKING SET

(71) Applicant: SHENZHEN FIRST UNION TECHNOLOGY CO., LTD., Shenzhen (CN)

(72) Inventors: Zexin Wu, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 448 days.

(21) Appl. No.: 17/758,305

(22) PCT Filed: Dec. 31, 2020

(86) PCT No.: PCT/CN2020/142212
§ 371 (c)(1),
(2) Date: Jul. 1, 2022

(87) PCT Pub. No.: WO2021/136517
PCT Pub. Date: Jul. 8, 2021

(65) Prior Publication Data

US 2023/0026749 A1 Jan. 26, 2023

(30) Foreign Application Priority Data

Jan. 3, 2020 (CN) ......................... 202020017338.9

(51) Int. Cl.
*A24F 40/46* (2020.01)
*H05B 3/46* (2006.01)

(52) U.S. Cl.
CPC ............... *A24F 40/46* (2020.01); *H05B 3/46* (2013.01)

(58) Field of Classification Search
None
See application file for complete search history.

(56) References Cited

U.S. PATENT DOCUMENTS 5,052,413 A * 10/1991 Baker ...................... A24C 5/00 131/194
2018/0049469 A1* 2/2018 Kaufman ............. A24B 15/167
(Continued)

FOREIGN PATENT DOCUMENTS

CN 102997395 A 3/2013
CN 207927771 U 10/2018
(Continued)

OTHER PUBLICATIONS

Machine translation of WO 2017133712 A1 (Year: 2025).*
Machine translation of WO 2014169465 A1 (Year: 2025).*

*Primary Examiner* — Michael H. Wilson
*Assistant Examiner* — Tobey C Le
(74) *Attorney, Agent, or Firm* — Proi Intellectual Property US

(57) ABSTRACT

The present application relates to the technical field of smoking sets, and embodiments of the present application are a heating assembly and an electric heating smoking set. The heating assembly comprises: a heating tube comprising a tube body and a conductive part formed on the tube body; at least a base, the base being connected to the tube body; an insulating element provided between the base and the tube body; and a conductive element provided on the base and comprising a first part and a second part which are electrically connected to each other, wherein the first part is located between the insulating element and the tube body and makes contact with the conductive part to form electric connection, the second part deviates in the direction away from the tube
(Continued)

body with respect to the first part, and the second part is used for being coupled with a power source.

20 Claims, 8 Drawing Sheets

(56) References Cited

U.S. PATENT DOCUMENTS

| | | | | |
|---|---|---|---|---|
| 2018/0184717 A1* | 7/2018 | Jiang | ........................ | A24F 40/44 |
| 2020/0046028 A1* | 2/2020 | Oh | ........................... | H05B 3/46 |
| 2020/0323263 A1* | 10/2020 | Liu | ......................... | A24F 40/40 |
| 2021/0076741 A1* | 3/2021 | Chen | ........................ | A24F 40/46 |
| 2021/0267277 A1* | 9/2021 | Qiu | ......................... | A24F 40/40 |

FOREIGN PATENT DOCUMENTS

| | | | | | |
|---|---|---|---|---|---|
| CN | 208259009 U | 12/2018 | | | |
| CN | 109846093 A | 6/2019 | | | |
| CN | 209359676 U | 9/2019 | | | |
| CN | 211794311 U | 10/2020 | | | |
| EP | 3412987 A1 | 12/2018 | | | |
| KR | 20180117071 A | 10/2018 | | | |
| WO | 03031145 A1 | 4/2003 | | | |
| WO | 2007037399 A1 | 4/2007 | | | |
| WO | WO-2014169465 A1 * | 10/2014 | | ............. | A24F 40/46 |
| WO | WO-2017133712 A1 * | 8/2017 | | .............. | C02F 1/003 |
| WO | WO-2018194291 A2 * | 10/2018 | | ............. | A24F 40/70 |
| WO | 2018205247 A1 | 11/2018 | | | |

* cited by examiner

HEATING ASSEMBLY AND ELECTRIC HEATING SMOKING SET

CROSS REFERENCE TO RELATED APPLICATION(S)

This application claims priority to Chinese Patent Application No. 202020017338.9, entitled "Heating assembly and electric heating smoking set" and submitted to China National Intellectual Property Administration on Jan. 3, 2020, the entire content of which is incorporated herein by reference.

TECHNICAL FIELD

The embodiment of the present disclosure relates to the technical field of smoking sets, and in particular to a heating assembly and an electric heating smoking set.

BACKGROUND

Electric heating smoking set is one of electronic cigarette products, for example, the electric heating smoking set is a low-temperature smoking set; the low-temperature smoking set refers to one configured to heat a cigarette in a low-temperature nonburning mode so that the cigarette can be inhaled.

Some electric heating smoking set products generally include a heating assembly and a power source, the power source is electrically connected to the heating assembly so that the power source provides a power support for the heating assembly. The heating assembly is mainly configured to generate heat to heat a cigarette or an e-liquid matrix. However, the heat generated by the heating assembly is easy to cause impact on the electric connection between parts, particularly on the welded structure point between parts; when the temperature is too high, the welded structure point is prone to damage, thereby causing circuit interruption between parts.

SUMMARY

The embodiment of the present disclosure aims to provide a heating assembly and an electric heating smoking set, of which the heating assembly may resolve the technical problem in existing technologies that the heat generated by the heating assembly is easy to cause damage on the electric connection structure.

The embodiment of the present disclosure employs the following technical scheme.

There is provided a heating assembly, including:

- a heating tube, which includes a tube body and a conductive part formed on the tube body;
- at least one base, which is connected to the tube body;
- an insulating element, which is provided between the base and the tube body; and
- a conductive element, which is provided on the base and includes a first part and a second part that are electrically connected to each other, wherein the first part is located between the insulating element and the tube body and makes contact with the conductive part to form an electric connection, the second part deviates in the direction away from the tube body with respect to the first part, and the second part is configured to be coupled with a power source.

Optionally, the base and the insulating element are together located between the first part and the second part of the conductive element, to separate the first part from the second part.

Optionally, the second part deviates along a radial direction of the tube body with respect to the first part.

Optionally, the conductive element further includes a connection section configured to connect the first part and the second part, and the connection section extends along the radial direction of the tube body.

Optionally, the conductive element is in the form of a metal sheet structure.

Optionally, the base and/or the insulating element are/is a high-temperature resistant heat-insulating material.

Optionally, the base includes a cylinder body, the insulating element is accommodated within the cylinder body or sleeved on outside of the cylinder body, the first part and second part of the conductive element are provided on inner and outer sides of the cylinder body correspondingly.

Optionally, one side of the cylinder body far away from the insulating element is provided with at least one fixing part configured to fasten the conductive element.

Optionally, the fixing part includes a fixing block formed in a protruding manner on an outer or inner surface of the cylinder body, the second part defines thereon a fixing hole matched with the fixing block, the fixing block is matched with the fixing hole to fasten the conductive element onto the base.

Optionally, the base further includes a flange extended out from the cylinder body, and the flange defines thereon a receiving hole for an end portion of the second part to pass through.

Optionally, the insulating element is made of an elastic material and is in a ring shape fitting with a shape of a surface of the tube body.

Optionally, the conductive part includes a first conductive part and a second conductive part, a heating part that is formed on the tube body is connected between the first conductive part and the second conductive part, and the heating part is configured to generate heat in the condition of electrical conduction.

Optionally, the first conductive part and the second conductive part are spaced and distributed along a circumferential direction of the tube body, and the base is provided with two conductive elements corresponding to the first conductive part and the second conductive part.

Optionally, the first conductive part and the second conductive part are provided symmetrically along a central axis of the tube body.

Optionally, the base is provided with a circumferential stop part configured to prevent the tube body from rotating.

Optionally, the circumferential stop part includes a positioning bulge protruded and provided on one side of the base facing the insulating element, and a tube wall of the tube body defines a positioning recess matched with the positioning bulge.

Optionally, at least part of the first conductive part and/or the second conductive part extends along an axial direction of the tube body.

Optionally, the tube body includes opposite first end part and second end part, the first conductive part is provided on the first end part, and the second conductive part is provided on the second end part;

the base includes a first base mounted on the first end part and a second base mounted on the second end part, the conductive elements on the first base and the second base are in electric contact with the first conductive part and the second conductive part correspondingly.

Optionally, the first conductive part and/or the second conductive part include(s) an annular electrode formed on the tube body.

Optionally, the base is provided with an axial stop part configured to prevent the tube body from an axial movement.

Optionally, the first conductive part and the second conductive part are a metal coating formed on the surface of the tube body.

Optionally, the heating part includes a resistor heating circuit layer attached on the surface of the tube body.

Optionally, the heating part includes a radiation material layer attached on the surface of the tube body that is configured to generate infrared radiation.

Optionally, the conductive part further includes a third conductive part, another heating part is connected between the third conductive part and the second conductive part, wherein the heating part connected between the first conductive part and the second conductive part and the another heating part connected between the second conductive part and the third conductive part are configured to heat different portions of the tube body respectively.

Optionally, the conductive part further includes a fourth conductive part and a fifth conductive part, and the heating part further includes a temperature measurement circuit layer connected between the fourth conductive part and the fifth conductive part.

Optionally, the heating assembly further includes a temperature sensor mounted on the base, the insulating element abuts against the temperature sensor so that the temperature sensor is pressed on the heating part.

In addition, the embodiment of the present disclosure further provides an electric heating smoking set, including:

the heating assembly as described above;

a power source, which is coupled with the second part in the heating assembly.

Compared with existing technologies, in the heating assembly, the first part abuts against the conductive part to form an electric connection, the second part deviates in the direction away from the tube body with respect to the first part, and the second part may be welded with an external power source to form an electric connection. During the operation process of the heating assembly, the heat is isolated by the insulating element, the temperature of the second part is much lower than the temperature of the first part, thereby preventing the welding point welded with the second part being damaged due to the effect of high temperature. The electric connection mode of the heating assembly makes the welding process simple and the welded structure point firm and not prone to damage.

BRIEF DESCRIPTION OF THE DRAWINGS

One or more embodiments are illustrated through the image(s) in corresponding drawing(s). These illustrations do not form restrictions to the embodiments. Elements in the drawings with a same reference number are expressed as similar elements, and the images in the drawings do not form proportional restrictions unless otherwise stated.

DETAILED DESCRIPTION

Figure 1:
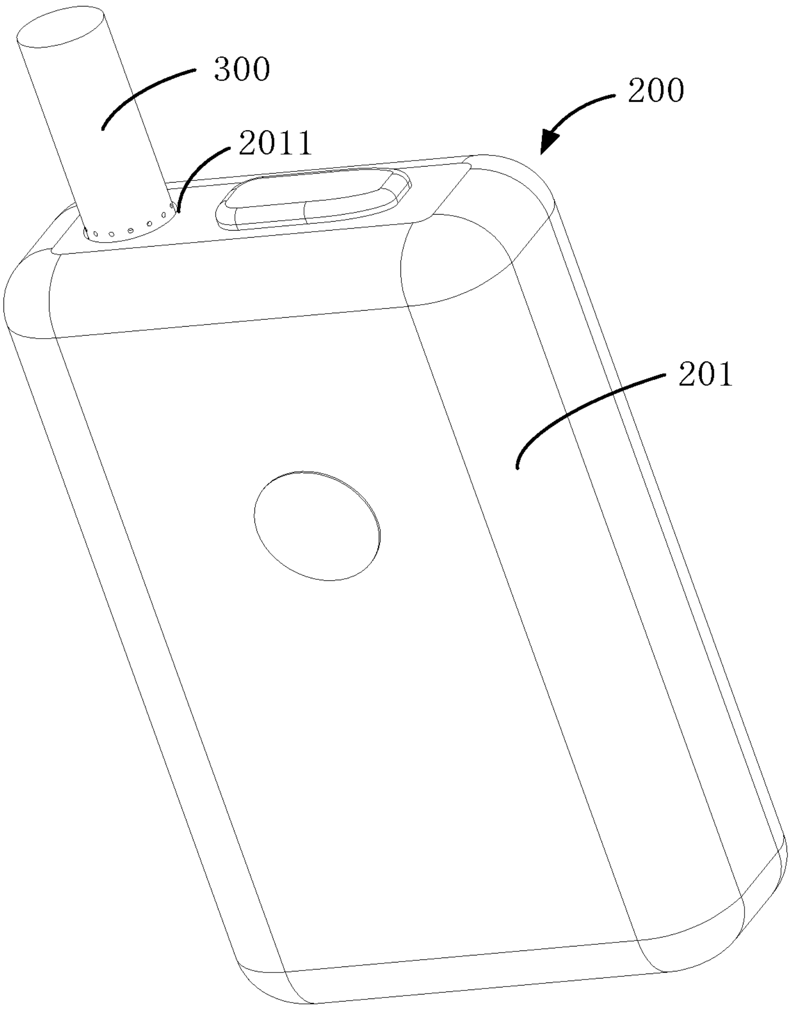
FIG. 1 is a structural diagram of an electric heating smoking set according to an embodiment of the present disclosure.

The present disclosure will become better understood from a more detailed description of the present disclosure below taken in conjunction with drawings and particular embodiments. It is to be noted that when an element is described as "fixed to" another element, it may be directly on the another element, or there might be one or more intermediate elements between them. When one element is described as "connected to" another element, it may be directly connected to the another element, or there might be one or more intermediate elements between them. The orientation or position relations indicated by such terms as "upper", "lower", "inner", "outer", "vertical" and "horizontal" used in the description are based on the orientation or position relations shown in the drawings, and are merely for conveniently describing the present disclosure and simplifying the description, rather than indicating or implying that the device or element must have the specific orientation and be constructed and operated according to the specific orientation. Therefore, they should not be construed as a limitation on the present disclosure. In addition, terms such as "first", "second", etc. are used merely for the purpose of description, and should not be construed as indicating or implying the degrees of importance.

Unless otherwise defined, all technical and scientific terms used in this description have the same meaning as those normally understood by the skill in the technical field of the present disclosure. The terms used in this description of the present disclosure are just for the purpose of describing particular embodiments, rather than limiting the present disclosure. Terms "and/or" used in the present disclosure include any and all combinations of one or more listed items.

In addition, technical features involved in different embodiments of the present disclosure described below may be combined mutually if no conflict is incurred.

Referring to FIG. 1 to FIG. 4, an embodiment of the present disclosure provides an electric heating smoking set 200, which is one of electronic cigarettes. For example, the electric heating smoking set 200 is a low-temperature smoking set, it is understandable that the low-temperature smoking set refers to one configured to heat a cigarette 300 in a low-temperature nonburning mode so that the cigarette 300 can be inhaled. Alternatively, the electric heating smoking set 200 is configured to heat an e-liquid matrix to form an inhalable aerosol.

An embodiment of the present disclosure provides a heating assembly 100, which is applicable to the electric heating smoking set 200 shown in FIG. 1.

Hereinbelow, the technical scheme of the present disclosure is described in detail by taking the electric heating smoking set 200 being a low-temperature smoking set as an example.

The electric heating smoking set 200 includes a shell 201, a power source 202, a control circuit board 203 and the heating assembly 100. The power source 202 is coupled with the heating assembly 100, to provide power support for the heating assembly 100. For example, the power source 202 is electrically connected to the control circuit board 203, and the control circuit board 203 is electrically connected to the heating assembly 100, so that the power source 202 can provide power support for the heating assembly 100. It is understandable that the control circuit board 203 may be provided with multiple functional circuits, for example, the control circuit board 203 is connected to an over-temperature protection circuit; when the temperature of the heating assembly 100 is higher than a preset temperature, the over-temperature protection circuit interrupts the electric connection between the power source 202 and the heating assembly 100. The power source 202 and the heating assembly 100 are together housed within the shell 201 and are fixedly mounted into the shell 201. The shell 201 defines a through insertion hole 2011, the insertion hole 2011 corresponds to the heating assembly 100 in terms of position, the cigarette 300 may enter inside of the shell 201 through the insertion hole 2011 and abuts against the heating assembly 100, so that the heating assembly 100 can heat the cigarette 300 in a low-temperature nonburning mode.

The heating assembly 100 includes a heating tube 10 and at least one base 20. The heating tube 10 is detachably mounted on the base 20, and the base 20 is fixedly mounted with the shell 201.

Figure 7:
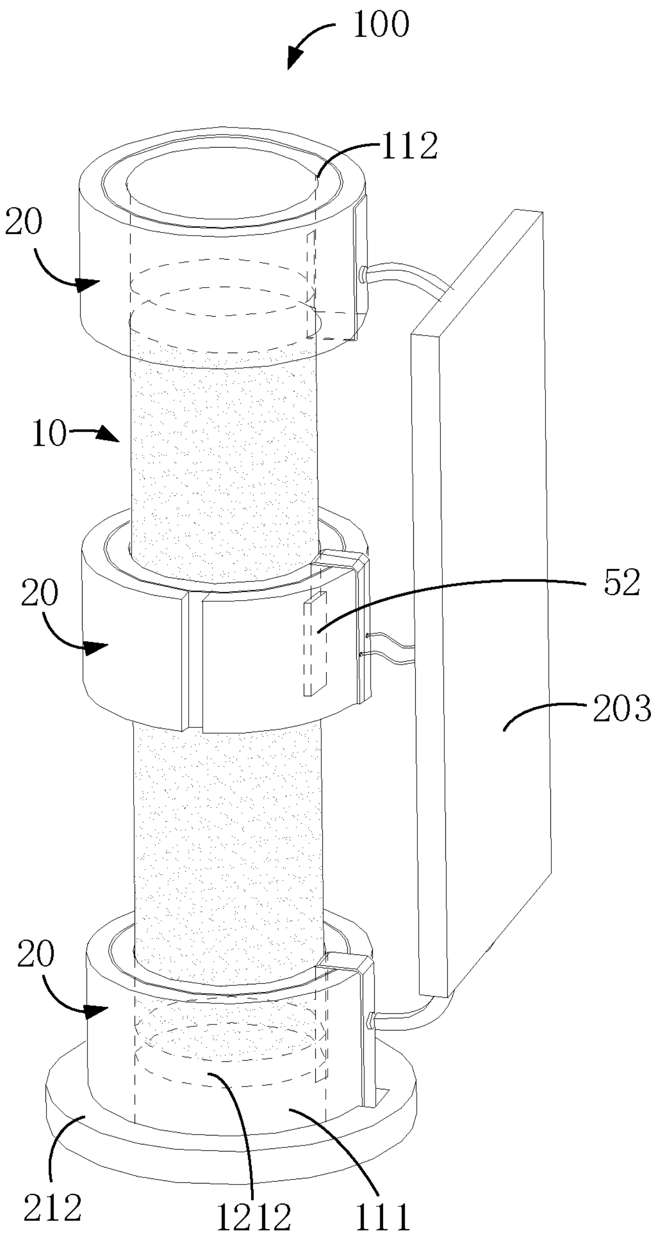
FIG. 7 is a structural diagram of yet another heating assembly according to an embodiment of the present disclosure.

Referring to FIG. 7, in some other embodiments, the heating tube 10 is connected to three bases 20, wherein two of the bases 20 are located on two ends of the heating tube 10 respectively, and one of the bases 20 is located on the middle of the heating tube 10. Optionally, the heating assembly 100 further includes a temperature sensor 52, and the temperature sensor 52 is mounted on the base 20 and pressed on the heating tube 10. The temperature sensor 52 is configured to detect the temperature of the heating tube 10, so as to perform intelligent control on the heating tube 10 to thus achieve the technical purpose of intelligent control of temperature.

Figure 2:
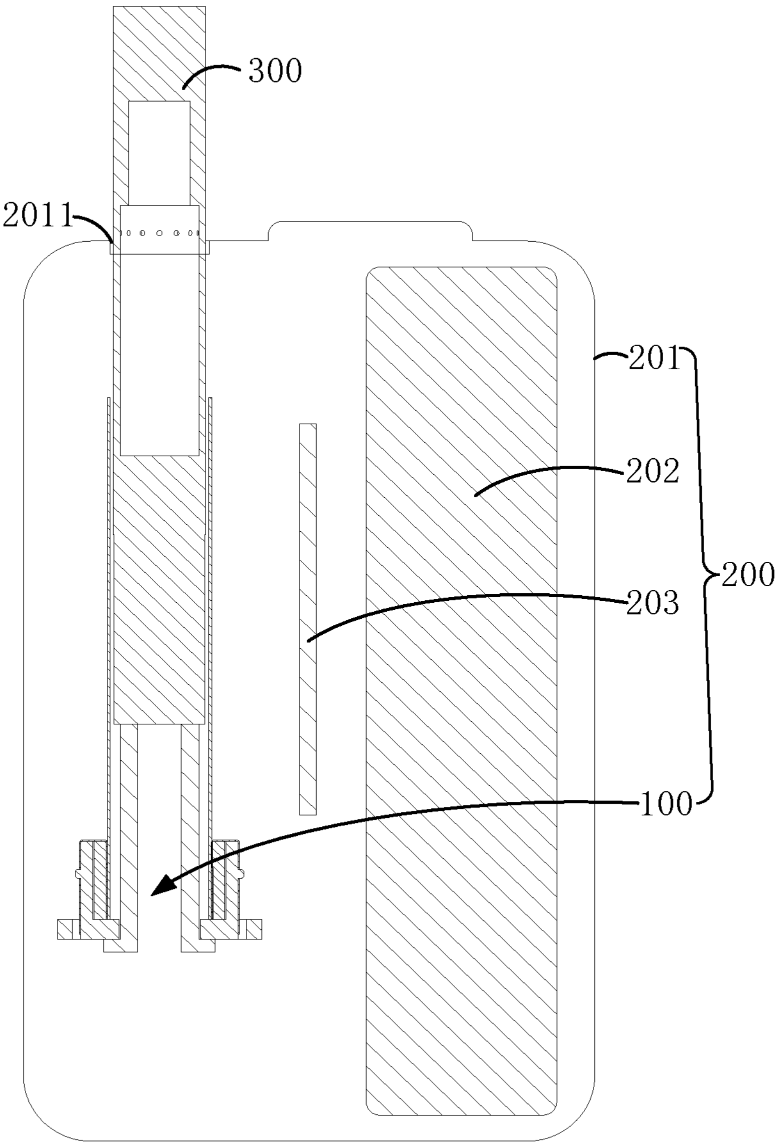
FIG. 2 is a sectional view of FIG. 1.
Figure 3:
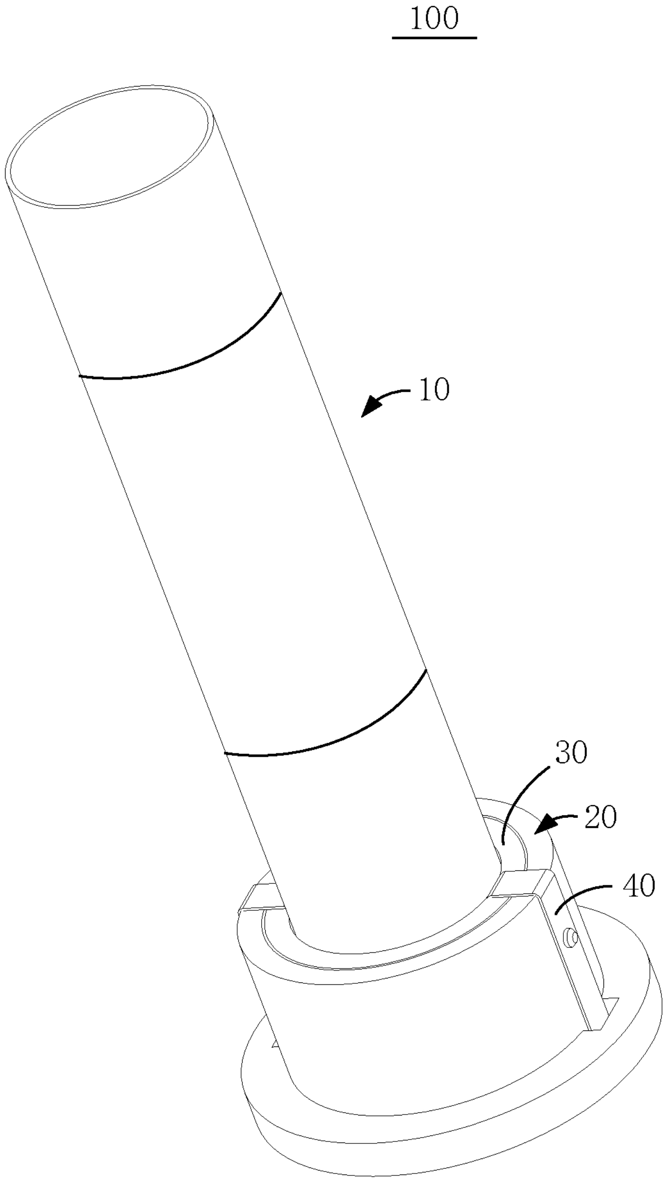
FIG. 3 is a structural diagram of a heating assembly shown in FIG. 2.
Figure 4:
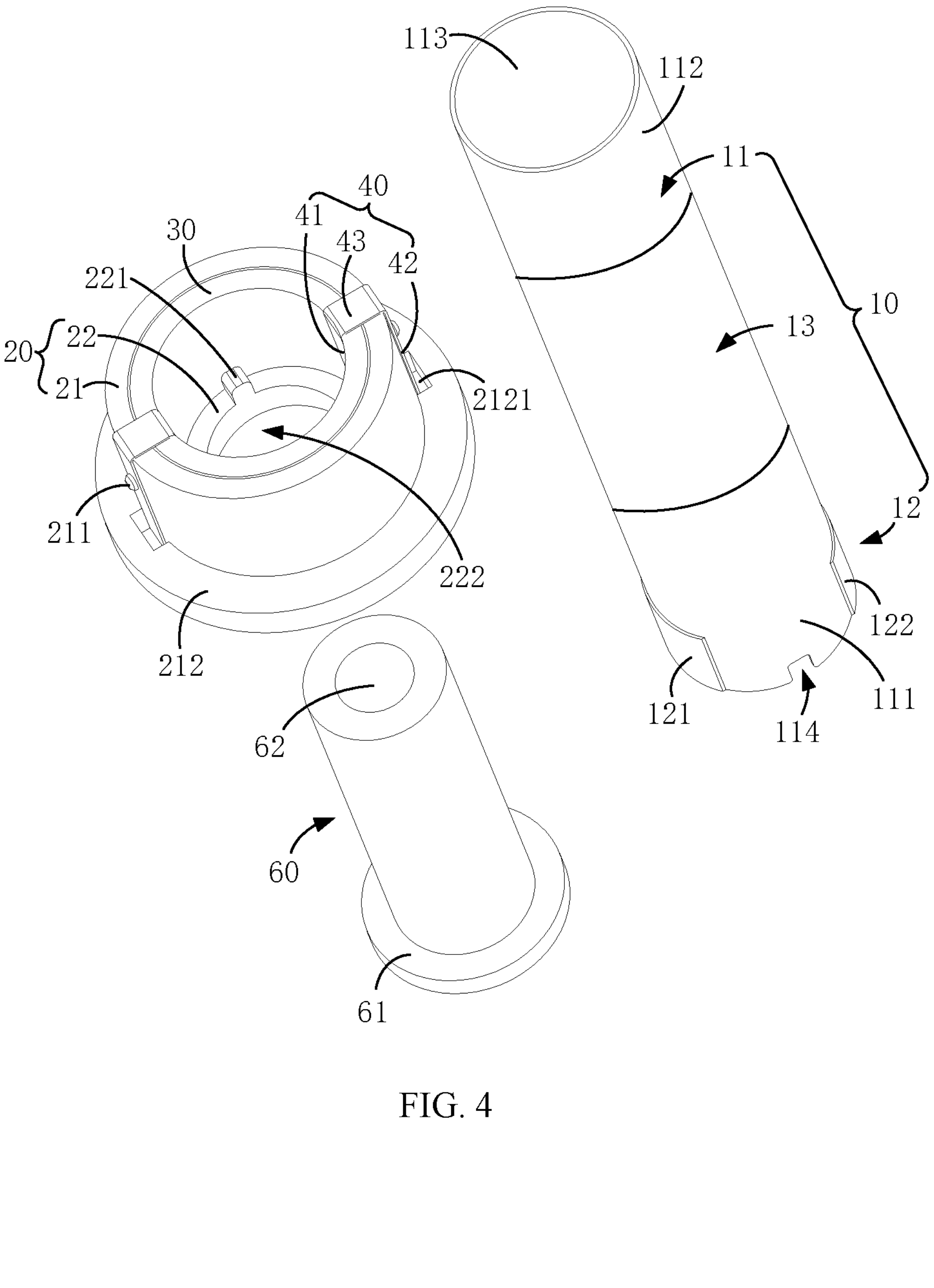
FIG. 4 is an exploded view of FIG. 3.

Referring to FIG. 2 to FIG. 4, the heating tube 10 presents a straight-line shaped structure, the power source 202 presents a straight-line shaped structure, the heating tube 10 and the power source 202 are in a parallel arrangement transversely, such that a compact spatial layout is enabled between each part of the electric heating smoking set 200, being conducive to miniaturization of the product. Here, both of the control circuit board 203 and the power source 202 are located on one same side of the heating tube 10, meanwhile the control circuit board 203 is located between the heating tube 10 and the power source 202. Optionally, the power source 202 is fixedly mounted on partial inside wall of the shell 201, the control circuit board 203 may be fixedly mounted on the power source 202, and the heating assembly 100 is fixedly mounted on another partial inside wall of the shell 201.

The heating tube 10 is a cylindrical tubular structure, and the heating tube 10 includes a tube body 11, a heating part 13 and a conductive part 12. The tube body 11 includes a first end part 111, a second end part 112, and a heating channel 113 running through the tube body 11. The heating channel 113 is of a straight-line shaped structure, wherein one opening of the heating channel 113 is located on the first end part 111, while the other opening of the heating channel 113 is located on the second end part 112. In the present embodiment, the one opening of the heating channel 113 located on the second end part 112 is aligned to the insertion hole 2011, the cigarette 300 is inserted into the heating channel 113 through the insertion hole 2011, the cigarette 300 is partially accommodated into the heating channel 113, and the cigarette 300 is heated within the heating channel 113. Optionally, the hole shape of the heating channel 113 is similar to the shape of the cigarette 300, and the heating channel 113 is a circular duct.

The tube body 11 is provided with the heating part 13, the heating part 13 is configured to generate heat in the condition of electrical conduction, so as to heat the cigarette 300 accommodated within the heating chamber 113. Optionally, the heating tube 10 is an electric heating tube, the heating part 13 includes a resistor heating circuit layer 131 attached on the surface of the tube body 11 that is configured to generate heat, and the resistor heating circuit layer 131 generates heat under the action of electric current.

Figure 8:
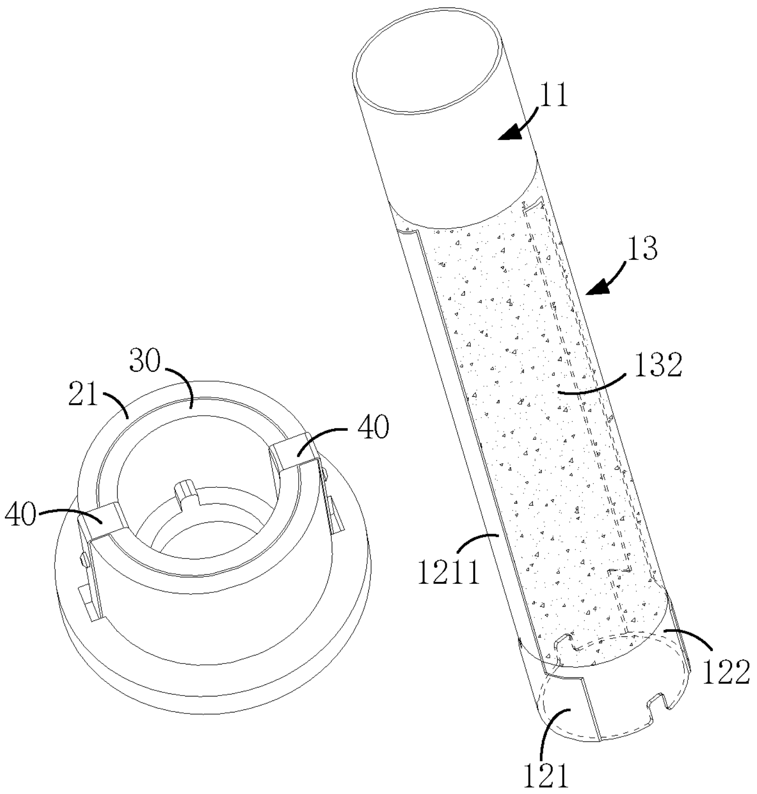
FIG. 8 is a structural diagram of still yet another heating assembly according to an embodiment of the present disclosure.

Referring to FIG. 8, in some other embodiments, the heating part 13 includes a radiation material layer 132, the radiation material layer 132 is attached on the surface of the tube body and configured to generate infrared radiation. The radiation material layer 132 is excited in the condition of electrical conduction to emit far infrared electromagnetic waves, thereby achieving the function of electric heating.

Referring to FIG. 3 and FIG. 4, the conductive part 12 is formed on the tube body 11. For example, the conductive part 12 includes a first conductive part 121 and a second conductive part 122, optionally, the first conductive part 121 and the second conductive part 122 are a metal coating formed on the surface of the tube body 11, wherein the heating part 13 that is formed on the tube body 11 is connected between the first conductive part 121 and the second conductive part 122. Here, the first conductive part 121 and the second conductive part 122 are spaced and distributed along a circumferential direction of the tube body 11; optionally, the first conductive part 121 and the second conductive part 122 are provided symmetrically along a central axis of the tube body. Optionally, at least part of the conductive part 12 extends along an axial direction of the tube body 11, for example, part of the first conductive part 121 extends along the axial direction of the tube body 11 to form an extension part 1211 (as shown in FIG. 8), the extension part 1211 electrically connects the first conductive part 121 and the heating part 13.

Figure 5:
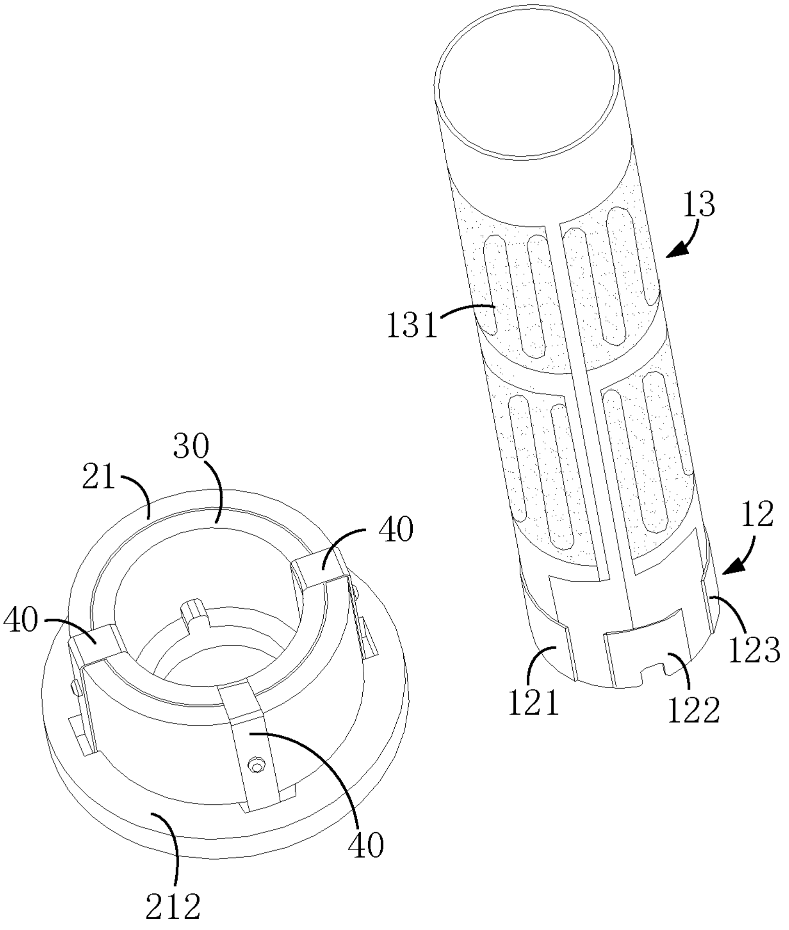
FIG. 5 is a structural diagram of another heating assembly according to an embodiment of the present disclosure.

Referring to FIG. 5, in some other embodiments, the conductive part 12 further includes a third conductive part 123, another heating part 13 is connected between the third conductive part 123 and the second conductive part 122, wherein the heating part 13 connected between the first conductive part 121 and the second conductive part 122 and the another heating part 13 connected between the second conductive part 122 and the third conductive part 123 are configured to heat different portions of the tube body 11 respectively.

Figure 6:
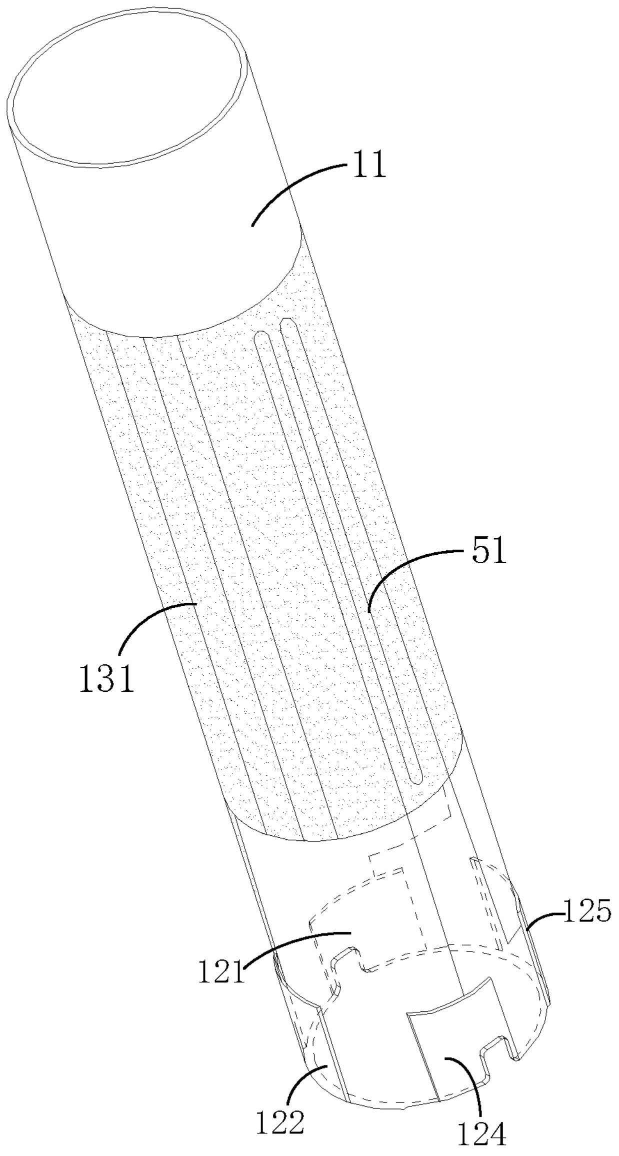
FIG. 6 is a structural diagram of another heating tube according to an embodiment of the present disclosure.

Referring to FIG. 6, in some other embodiments, the heating tube 10 further includes a temperature measurement circuit layer 51, and the temperature measurement circuit layer 51 is provided on the outside wall of the tube body 11. The temperature measurement circuit layer 51 is configured to detect the temperature of the tube body 11, so as to perform intelligent control on the heating part 13 to thus achieve the technical purpose of intelligent control of temperature. Further, the conductive part 12 further includes a fourth conductive part 124 and a fifth conductive part 125, the tube body 11 is further provided with the fourth conductive part 124 and the fifth conductive part 125. The temperature measurement circuit layer 51 is connected between the fourth conductive part 124 and the fifth conductive part 125.

Referring to FIG. 3 and FIG. 4, the base 20 includes a cylinder body 21. Optionally, the base 20 is made of a high-temperature resistant heat-insulating material. The heating tube 10 is detachably mounted within the cylinder body 21, or, the heating tube 10 is detachably sleeved on outside of the cylinder body 21. For example, the first end part 111 is detachably mounted within the cylinder body 21. The base 20 is provided with a circumferential stop part configured to prevent the tube body 11 from rotating, the circumferential stop part includes a positioning bulge 221 protruded and provided on one side of the base 20 facing the tube body 11, and a tube wall of the tube body 11 defines a positioning recess 114 matched with the positioning bulge 221. When the tube body 11 is assembled within the cylinder body 21, the positioning bulge 221 is in snap-fit with the positioning recess 114, thereby preventing the tube body 11 from a circumferential rotation relative to the base 20. Further, the base 20 is provided with an axial stop part configured to prevent the tube body 11 from an axial movement. Optionally, the axial stop part is a baseplate 22, and the baseplate 22 is fixed on one end of the cylinder body 21, to prevent the tube body 11 from an axial movement. Here, an inside of the baseplate facing the cylinder body 21 is provided with the positioning bulge 221 that is protruded.

The heating assembly 100 further includes an insulating element 30, and the insulating element 30 is provided between the base 20 and the tube body 11. In the present embodiment, the insulating element 30 is of a ring structure, the shape of the insulating element 30 is a ring shape fitting with the shape of the surface of the tube body 11. The insulating element 30 is accommodated within the cylinder body 21 or sleeved on outside of the cylinder body 21 correspondingly; in the present embodiment, the insulating element 30 is accommodated within the cylinder body 21 correspondingly, and an outside wall of the insulating element 30 abuts against an inside wall of the cylinder body 21. Optionally, the insulating element 30 is made of an insulating, high-temperature resistant heat-isolating elastic material, for example, the insulating element 30 is made of a silicone rubber, having an insulating, high-temperature resistant and sealing effect. In the present embodiment, the high-temperature resistant material refers to a high-temperature resistant material capable of withstanding over 240° C.

The heating assembly 100 further includes one or more conductive elements 40, the conductive element 40 is in a metal sheet shaped structure. The conductive element 40 is provided on the base 20 and abuts against the conductive part 12 to form an electric connection, for example, the conductive part 12 includes the first conductive part 121 and the second conductive part 122, then the base 20 is provided with two conductive elements 40 corresponding to the first conductive part 121 and the second conductive part 122.

Both of the first conductive part 121 and the second conductive part 122 are provided on one same end part of the tube body 11, or located on two opposite end parts of the tube body 11, for example, as shown in FIG. 7, the tube body 11 includes the first end part 111 and the second end part 112 that are opposite, the first conductive part 121 is provided on the first end part 111, and the second conductive part 122 is provided on the second end part 112, wherein the tube body 11 is provided with three bases 20, that is, the tube body 11 is provided with a first base, a second base and a third base, the first end part 111 is provided with the first base, the second end part 112 is provided with the second base, and the middle of the tube body 11 is provided with the third base; the conductive elements 40 on the first base and the second base are in electrical contact with the first conductive part 121 and the second conductive part 122 correspondingly. Further, the first conductive part 121 and/or the second conductive part 122 includes an annular electrode 1212 formed on the tube body 11.

Referring to FIG. 3 and FIG. 4, the conductive element 40 includes a first part 41 and a second part 42 that are electrically connected to each other. The first part 41 is located between the insulating element 30 and the tube body 11 and makes contact with the conductive part 12 to form an electric connection. The second part 42 deviates in the direction away from the tube body 11 with respect to the first part 41, for example, the second part 42 deviates along a radial direction of the tube body 11 with respect to the first part 41. The second part 42 is configured to be coupled with the power source 202, so that the power source 202 provides power support for the heating assembly 100. Optionally, the first part 41 corresponds to the conductive part 12 on the tube body 11 in terms of position, wherein the insulating element 30 is configured to enable the first part 41 to abut against the tube body 11 so that the first part 41 makes contact with the conductive part 12 on the tube body 11, to form an electric connection.

In the present embodiment, the base 20 and the insulating element 30 are together located between the first part 41 and the second part 42 of the conductive element 40, to separate the first part 41 from the second part 42. Optionally, the first part 41 and the second part 42 are provided on inside and outside of the cylinder body 21 correspondingly. Further, the conductive element 40 further includes a connection section 43 configured to connect the first part 41 and the second part 42, and the connection section 43 extends along the radial direction of the tube body 11.

One side of the cylinder body 21 far away from the insulating element 30 is provided with at least one fixing part configured to fasten the conductive element 40. The fixing part includes a fixing block 211 formed in a protruding manner on an outer or inner surface of the cylinder body 21; in the present embodiment, the outside of the cylinder body 21 is provided with the fixing block 211 that is protruded. The second part 42 defines thereon a fixing hole (not shown in figures) matched with the fixing block 211, the fixing block 211 is matched with the fixing hole to fasten the conductive element 40 onto the base 20. Further, the base 20 further includes a flange 212 extended out from the cylinder body 21, and the flange 212 defines thereon a receiving hole 2121 for an end portion of the second part 42 to pass through.

In the present embodiment, under the action of elastic pressing between the insulating element 30 and the tube body 11, the first part 41 abuts against and is fixed with the conductive part 12 to form an electric connection. In addition, the insulating element 30 that has an elastic performance can seal the connection between the tube body 11 and the base 20, thereby preventing the gas and/or liquid within the heating channel 113 entering one side of the conductive part 12, and achieving the function of protecting the circuit structure. In addition, the heating part 13 is electrically connected to the conductive part 12, the conductive part 12 is electrically connected to the first part 41 of the conductive element 40, the second part of the conductive element 40 is configured to be welded with a power supply circuit to form an electric connection structure, for example, the second part 42 of the conductive element 40 is electrically welded with an output end of the control circuit board 203. The conductive element 40 is electrically connected to the control circuit board 203, so that the power source 202 can provide power support for the heating part 13. During the operation process of the heating assembly 100, the heat inside the heating tube 10 is uneasy to transmit to the outside wall of the base 20, that is, the temperature of the second part 42 is much lower than the temperature of the first part 41, such that the welding point welded with the second part 42 is firm, not prone to damage, thus ensuring the quality of the product.

It is understandable that the conductive part 12 and the conductive element 40 are both made of a metal conductive material, for example, a copper or copper alloy material.

As shown in FIG. 4, further, the heating assembly 100 further includes a supporting tube 60. The supporting tube 60 is of a straight-line shaped tubular structure, and the supporting tube 60 includes an airflow channel 62. One opening of the airflow channel 62 is located on one end part of the supporting tube 60, while the other opening is located on the other opposite end part of the supporting tube 60, an outside wall of the supporting tube 60 is provided with a fixing element 61 which is protruded along the radial direction, and the fixing element 61 is roughly in a ring structure. One side of the baseplate 22 facing the cylinder body 21 defines a through receding hole 222, the supporting tube 60 passes through the receding hole 222 and is sleeved into the heating channel 113 within the first end part 111, so that the airflow channel 62 is communicated with the heating channel 113, the fixing element 61 is clamped on the edge of the receding hole 222, that is the fixing element 61 is in fixed connection with the baseplate 22.

In the present embodiment, a tube wall of the supporting tube 60 accommodated within the heating channel 113 serves as a supporting element, the cigarette 300 enters from the opening end of the heating channel 113 on the second end part 112 and abuts against the tube wall of the supporting tube 60, the cigarette 300 is located and housed within the heating channel 113 under the action of supporting of the tube wall of the supporting tube 60; when a user controls the heating part 13 to be electrically conducted, the heating part 13 starts to generate heat, and the cigarette 300 is heated under the action of the heat so that the user can inhale the cigarette 300. In addition, the insulating element 30 which is made of an elastic sealing material has a good sealing effect and thus achieves the function of protecting the circuit structure. When a user inhales a cigarette 300, the air flow passes through the airflow channel 62 and the heating channel 113 in turn and finally enters the mouth of the user, thus completing the inhalation action. The air circuit is stable in structure and smooth in airflow guide.

To sum up, the technical scheme of the present disclosure includes but not limited to the following advantages.

1. In the heating assembly 100 of the present embodiment, the first part 41 abuts against the conductive part 12 to form an electric connection, the second part 42 deviates in the direction away from the tube body 11 with respect to the first part 41, and the second part 42 may be welded with an external power source 202 to form an electric connection. During the operation process of the heating assembly 100, the heat is isolated by the insulating element 30, the temperature of the second part 42 is much lower than the temperature of the first part 41, thereby preventing the welding point welded with the second part 42 being damaged due to the effect of high temperature. The electric connection mode of the heating assembly 100 in the present embodiment makes the welding process simple and the welded structure point firm and not prone to damage.

2. The insulating element 30 and the conductive element 40 may be fixedly mounted on the base 20, however, the heating tube 10 is detachably mounted on the base 20, such that the assembly is easy and simple.

3. The insulating element 30 which is made of an elastic sealing material has a good sealing effect and thus achieves the function of protecting the circuit structure. When a user inhales a cigarette 300, the air flow passes through the airflow channel 62 and the heating channel 113 in turn and finally enters the mouth of the user, thus completing the inhalation action. The air circuit is stable in structure and smooth in airflow guide.

Finally, it should be noted that the above embodiments are merely to illustrate, but to limit, the technical scheme of the present disclosure. Under the thought of the present disclosure, technical features in the above embodiments or different embodiments may be combined, steps may be implemented in any order, and there exist many other changes of different aspects for what described above; for conciseness, they are not provided in detail. Although the present disclosure is described in detail with reference to the above embodiments, the ordinary skill in the art should understand that modifications are still possible for the technical schemes described in each above embodiment or partial technical schemes can be equivalently substituted; however, these modifications or substitutions do not get the essence of the technical scheme departed from the scope of the corresponding technical scheme in each embodiment of the present disclosure.

What is claimed is:

1. A heating assembly for use in a cigarette, comprising:

a heating tube, which comprises a tube body and a conductive part formed on the tube body;

at least one base, which is connected to the tube body;

an insulating element, which is provided between the base and the tube body; and a conductive element, which is provided on the base and comprises a first part and a second part that are electrically connected to each other, wherein the first part makes contact with the conductive part to form an electric connection, the second part deviates in a direction away from the tube body with respect to the first part, and the second part is configured to be coupled with a power source, wherein the base comprises a cylinder body;

the insulating element is accommodated within the cylinder body of the base;

the tube body is surrounded by the insulating element;

the insulating element is elastic and is in a compressed state;

the first part of the conductive element is disposed between the tube body and the insulating element, and is located on an inner circumferential surface of the insulating element;

wherein the conductive element further comprises a connection section configured to connect the first part and the second part, and the connection section is located, in an axial direction of the tube body, on an end surface of the tube body and the insulating element; wherein the end surface extends in a direction perpendicular to the axial direction of the tube body, wherein the first part and the second part are positioned on opposite sides of the connection section, the first part is located on the inner surface of the insulating element and the second part is located on the outer surface of the cylinder body.

2. The heating assembly according to claim 1, wherein the base and the insulating element are together located between the first part and the second part of the conductive element.

3. The heating assembly according to claim 2, wherein the second part deviates along a radial direction of the tube body with respect to the first part.

4. The heating assembly according to claim 3, wherein the connection section extends along the radial direction of the tube body.

5. The heating assembly according to claim 1, wherein the conductive element is in the form of a metal sheet structure.

6. The heating assembly according to claim 1, wherein the base and/or the insulating element are/is a high-temperature resistant heat-insulating material.

7. The heating assembly according to claim 1, wherein the second part of the conductive element is provided on an outer side of the cylinder body.

8. The heating assembly according to claim 7, wherein one side of the cylinder body far away from the insulating element is provided with at least one fixing part configured to fasten the conductive element.

9. The heating assembly according to claim 8, wherein the fixing part comprises a fixing block formed in a protruding manner on an outer or inner surface of the cylinder body, the second part defines thereon a fixing hole matched with the fixing block, and the fixing block is matched with the fixing hole to fasten the conductive element onto the base.

10. The heating assembly according to claim 7, wherein the base further comprises a flange extended out from the cylinder body, and the flange defines thereon a receiving hole for an end portion of the second part to pass through.

11. The heating assembly according to claim 7, wherein the insulating element is made of an elastic material and is in a ring shape fitting with a shape of a surface of the tube body.

12. The heating assembly according to claim 1, wherein the conductive part comprises a first conductive part and a second conductive part, a heating part that is formed on the tube body is connected between the first conductive part and the second conductive part, and the heating part is configured to generate heat in the condition of electrical conduction.

13. The heating assembly according to claim 12, wherein the first conductive part and the second conductive part are spaced and distributed along a circumferential direction of the tube body, and the base is provided with a further conductive element, wherein the further conductive element together with said conductive element correspond to the first conductive part and the second conductive part.

14. The heating assembly according to claim 13, wherein the base is provided with a circumferential stop part configured to prevent the tube body from rotating.

15. The heating assembly according to claim 14, wherein the circumferential stop part comprises a positioning bulge protruded and provided on one side of the base facing the insulating element, and a tube wall of the tube body defines a positioning recess matched with the positioning bulge.

16. The heating assembly according to claim 12, wherein at least a part of the first conductive part and/or the second conductive part extends along the axial direction of the tube body.

17. The heating assembly according to claim 12, wherein the tube body comprises a first end part and a second end part opposite each other, the first conductive part is provided on the first end part, and the second conductive part is provided on the second end part;

the base comprises a first base mounted on the first end part and a second base mounted on the second end part, the conductive element and the further conductive element are in electric contact with the first conductive part and the second conductive part correspondingly.

18. The heating assembly according to claim 17, wherein the first conductive part and/or the second conductive part comprise(s) an annular electrode formed on the tube body.

19. The heating assembly according to claim 17, wherein the base is provided with an axial stop part configured to prevent the tube body from an axial movement.

20. An electric heating smoking set, comprising:

the heating assembly according to claim 1; and a power source, which is coupled with the second part in the heating assembly.

* * * * *